(12) United States Patent  (10) Patent No.: US 9,148,488 B2
Rabetge et al.  (45) Date of Patent: Sep. 29, 2015

(54) CONFIGURATION DOMAINS FOR THE CONFIGURATION OF WEB SERVICES AND CONSUMER PROXIES

(75) Inventors: Christian Rabetge, Sinsheim (DE); Thomas Kunz, Lilienweg (DE); Otto Boehrer, Wiesloch-Schatthausen (DE); Alexander Zubev, Bulgaria (BG); Timm Falter, Kreuzaecker (DE); Vladimir Savchenko, Sofia (BG)

(73) Assignee: SAP AG, Walldorf (DE)

( * ) Notice: Subject to any disclaimer, the term of this patent is extended or adjusted under 35 U.S.C. 154(b) by 1587 days.

(21) Appl. No.: 11/937,348

(22) Filed: Nov. 8, 2007

(65) Prior Publication Data

US 2009/0125612 A1    May 14, 2009

(51) Int. Cl.
*G06F 15/177* (2006.01)
*H04L 29/08* (2006.01)

(52) U.S. Cl.
CPC .............. *H04L 67/306* (2013.01); *H04L 67/02* (2013.01); *H04L 67/327* (2013.01)

(58) Field of Classification Search
USPC ........................................................ 709/220
See application file for complete search history.

(56) References Cited

U.S. PATENT DOCUMENTS

| 8,646,026 B2* | 2/2014 | Chang ............................... 726/1 |
| 2004/0148184 A1* | 7/2004 | Sadiq ................................ 705/1 |
| 2005/0086330 A1* | 4/2005 | Perham et al. ................ 709/220 |
| 2008/0155557 A1* | 6/2008 | Bezrukov et al. ............. 719/316 |

* cited by examiner

*Primary Examiner* — Andrew Georgandellis
(74) *Attorney, Agent, or Firm* — Mintz Levin Cohn Ferris Glovsky and Popeo, P.C.

(57) ABSTRACT

Methods and apparatus, including computer program products, for configuration domains for the configuration of web services and consumer proxies. In general, data characterizing one or more web services to activate is received and run-time configurations are caused to be generated for each of the web services and each of consumer proxies for the web services. The web services are from a provider system in a group of systems having a profile having one or more policies to be adhered to by the systems. The systems may include a consumer system and the provider system. The consumer system may have one or more consumer proxies to call the web services. The run-time configurations may include one or more settings derived from the policies of the profile.

14 Claims, 4 Drawing Sheets

CONFIGURATION DOMAINS FOR THE CONFIGURATION OF WEB SERVICES AND CONSUMER PROXIES

BACKGROUND

The present disclosure relates to data processing by digital computer, and more particularly to configuration domains for the configuration of web services and consumer proxies.

In general, types of computer software applications that are accessible through a network in a service-oriented architecture may be referred to as web services. Web services may provide services of a system referred to as a provider system to a system referred to as a consumer system. Some systems may be both a service provider in some contexts and a service consumer in other contexts. For example, a system may be a service provider by offering services to other systems and that system may be a service consumer by requesting services of other service providers.

To enable web services to be provided, a configuration of a web service provider and web service consumer may need to be performed. In an application landscape including many web services, many details of web service providers and consumers may need to be configured individually. Configuration of web services may require technical knowledge of a specific system landscape, details of specific web services, and other information and the configuration process may require technical knowledge of how the components of the landscape work.

SUMMARY

The subject matter disclosed herein provides methods and apparatus, including computer program products, that implement techniques related to configuration of web services.

In one general aspect, data characterizing one or more web services to activate is received and run-time configurations are caused to be generated for each of the web services and each of consumer proxies for the web services. The web services are from a provider system in a group of systems having a profile having one or more policies to be adhered to by the systems. The systems include a consumer system and the provider system. The consumer system is to have one or more consumer proxies to call the web services. The run-time configurations include one or more settings derived from the policies of the profile.

In a related aspect, data characterizing a request to generate a domain, a profile to associate with the domain, and a selection of systems to add to the domain is received, where the selection of systems includes a consumer system having one or more consumer proxies. The domain is generated, where the domain includes a list of the systems and an association of the domain with the profile including one or more policies. A selection of an application of the consumer system to activate for a business process is received, a determination of web services to activate for the business process is made, a determination that one or more provider systems are provider systems to provide the web services of the business process is made, and a determination that the domain is a common domain of the provider systems and the consumer system is made. Run-time configurations are caused to be generated for each of the web services and each of the consumer proxies, where the run-time configurations include one or more settings derived from the policies of the profile of the domain.

In a related aspect, data characterizing one or more web services to activate for web services of a provider system is received. The provider systems are in a domain of systems being a group of the systems having at least one profile having policies to be adhered to by the systems in the domain, and the systems in the domain include a consumer system and the provider system. A run-time configuration is caused to be generated for each of the web services and a run-time configuration is caused to be generated for each of one or more consumer proxies. The run-time configurations include one or more settings derived from the profile of the domain.

In a related aspect, a selection of systems to add to a domain and a profile for the domain is received where systems have one or more web services. The systems are added to the domain and the domain is stored with a list of systems and an association with the profile.

The subject matter may be implemented as, for example, computer program products (e.g., as source code or compiled code tangibly embodied in computer-readable media), computer-implemented methods, and systems.

Variations may include one or more of the following features.

Receiving data and causing run-time configurations to be generated may be performed at a services registry. Run-time configurations of web services may be generated at a provider system. Run-time configurations of consumer proxies may be generated at a consumer system.

A selection of a business process to activate may be received. A determination may be made as to which web services of the business process to activate.

A consumer system and a provider system may be in another group of systems having another profile. One profile may be selected instead of the other profile based on one or more rules for determining a profile to which to adhere. For example, each group may have a ranking and the rules may prescribe a profile of a group with a highest rank is to be selected.

Settings of a run-time configuration may be derived from policies of a profile by copying portions of the policies. Settings of a run-time configuration may be derived from policies of a profile based on an interpretation of the policies by a parser and a determination of one or more values for the settings based on the policies.

Run-time configurations may include a run-time configuration for a consumer proxy to call a first web service having another run-time configuration. The run-time configuration of the consumer proxy may be based on content of a service description of the web service, settings of a destination template for a provider system, and a profile referenced by the destination template (being the profile of the provider system). The run-time configuration of the web service may be based on design-time attributes of the web service and a profile of the domain to which the provider system of the web service belongs.

Policies of a profile may include one or more security policies for communication between consumer proxies and web services.

Data characterizing another domain to generate for a group of systems and a profile to associate with the domain may be received. Data characterizing the domain as including the systems in the domain and the profiles as being associated with the domain may be stored.

Data characterizing a second domain to generate may be received, where the second domain is to include the systems of a first domain and a second profile different from a first profile of the first domain. The second profile includes second one or more policies being different from first policies of the first profile. The second domain may be generated including the systems and an association of the second domain with the second profile. A selection of another application of a consumer system to activate for a second business process may be received. A determination of second web services to activate for the second business process may be made. A determination of first provider systems of a first set of web services as being provider systems to provide the second web services of the second business process may be made. A determination of first and second domains as being common domains of the first provider systems and the consumer system may be made. A determination of the first domain being ranked higher than the second domain based on a ranking associated with each of the first and second domains may be made. Second run-time configurations may be caused to be generated for each of the first web services and each of the consumer proxies, where the second run-time configurations including one or more settings derived from the first policies of the first profile of the first domain.

The subject matter described herein can be implemented to realize one or more of the following advantages. Web services and their consumer proxies may be configured in accordance with one or more policies of a domain, which may avoid inconsistent configuration of consumer proxies. For example, by grouping configuration, instead of providing independent, individual web service configuration, transparency of the web service configuration may be improved, a consistent change management process may be provided when a reaction to changes in the system landscape or in business processes is necessary, and effort for configuring web services and their proxies may be reduced. The configuration may be automatic, which may avoid manual, individual configuration of many consumer proxies and may ensure consistent configuration where it is desired. The configuration and a determination of which web services to configure may be based on web services of an application to be activated by a business administrator such that a business administrator need not be familiar with the web services themselves or how to configure them.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
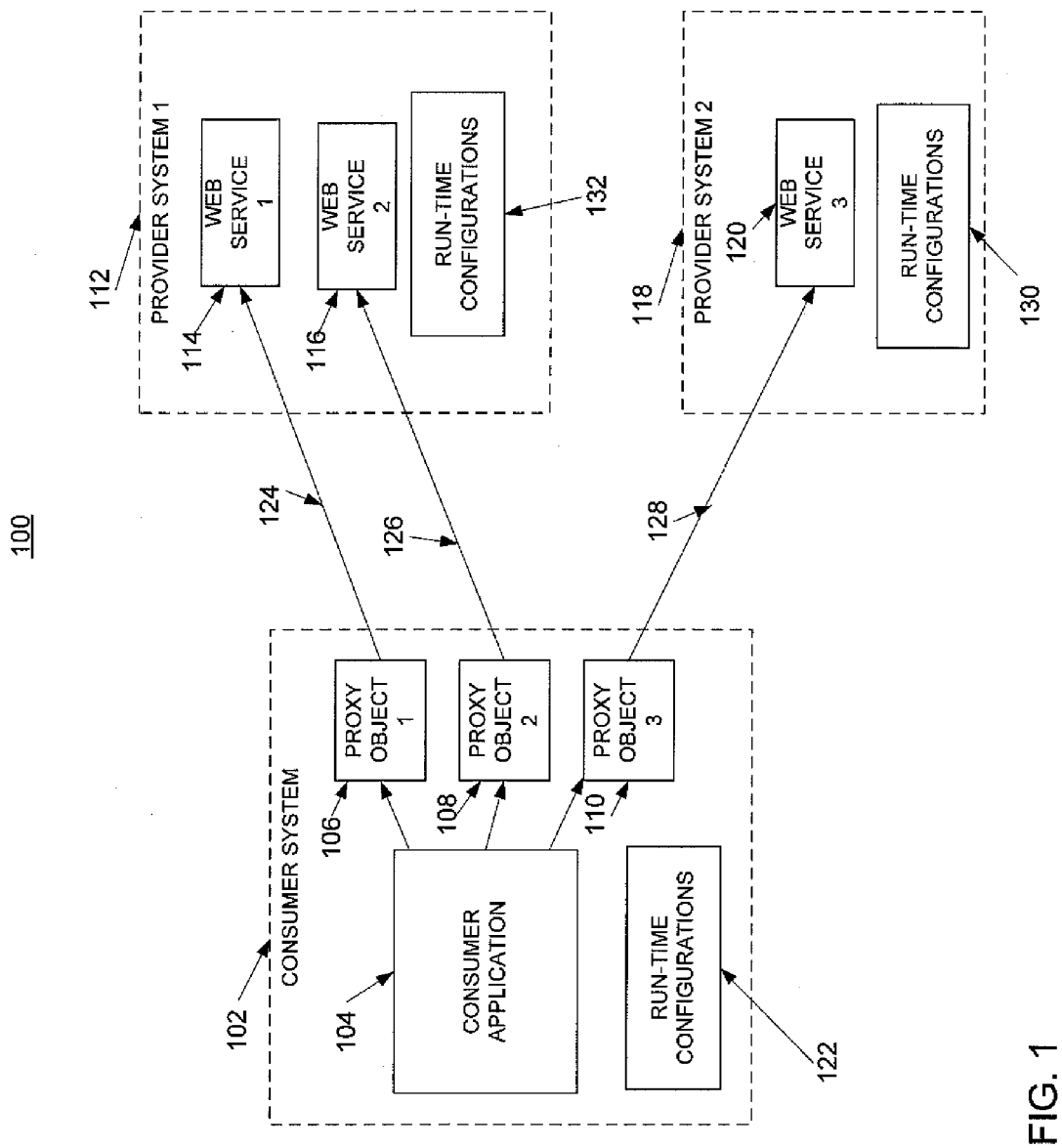
FIG. 1 is a block diagram of a system landscape of consumer and provider systems to communicate through web service calls at run-time.

In general, a separation of phases of development or deployment of systems described in the following description may include design-time, technical configuration time, business configuration time, and run-time. In general, design-time may refer to a development of web services or applications that use web services, such as source code programming of an application that uses web services. Technical configuration time may refer to configuration of a deployed application at a level which removes technical details from requiring further configuration, and does not involve activation of web services. For example, technical configuration may involve selecting systems, configuring systems, selecting policies, and configuring policies that may hold for all web services between the selected systems (e.g., all systems of a configuration domain in which systems are selected to be a part). Technical configuration may be performed by a technical administrator. In contrast to technical configuration, business configuration may refer to configuration of a deployed application and web services, which may be at a level at which extensive technical knowledge is not required. For example, business configuration may be performed by a business administrator who has knowledge of business process modeling but has limited technical knowledge related to configuring systems in a system landscape.

In general, a distinction between technical configuration and business configuration may be further described as follows. During technical configuration a system landscape may only be prepared for configuration of web services. This preparation may be independent of web services that might get configured between the systems of a system landscape later (during a business configuration). Thus, a technical administrator might not know anything about concrete web services. He or she may only deal with systems, policies and the like, but not with web services. During a technical configuration only technical web services necessary for configuration, itself may be capable of running and web services for a business process might not be capable of being activated.

During a business configuration a business administrator may decide whether a concrete web service shall be activated. In some cases, he or she is not even aware of web services, and may enable a business process (that results in activating its web services). But in some cases the business administrator may need to select a system which shall provide a web service. And, in any case a business configuration may result in a configuration of web services, a configuration of consumer proxies for web services, or a configuration of both.

A business configuration uses results from a technical configuration. On the other hand, a technical configuration might not use results from a business configuration. Therefore, a first technical configuration takes place before a beginning of a first business configuration.

Technical configuration should determine as much settings as possible, which are independent of specific web services, leaving remaining configuration to be performed in a business configuration.

Run-time may refer to a run-time version of a system landscape where a deployed and configured application may use web services activated by a business administrator during the business configuration phase. A user who interacts with a run-time phase may be referred to as a business user.

In general, a configuration domain may refer to a group of systems for which a same profile is prescribed. There is one configuration profile per a domain. A configuration profile may be a group of one or more configuration policies that may be prescribed to web services, consumer proxies, or both by configuring settings in accordance with the policies. A communication profile may be a type of configuration profile that may describe policies to be applied for communication. Similar to a communication profile may be a security profile, which may describe security policies. Where a security profile is used to configure communication settings, security profile and communication profile may be interchangeable. In some implementations, there may be multiple profiles for a domain.

Web services may be application programming interfaces that may be accessed over a network, such as the Internet, and executed on a system hosting requested services.

FIG. 1 is a block diagram of a system landscape 100 of consumer and provider systems 102, 112, 118 to communicate through web service calls 124, 126, 128 at run-time. In general, the consumer system 102 may include a consumer application 104 that may consume web services through web service calls 124, 126, 128 with the use of proxy objects 106, 108, 110 and run-time configurations 122. The provider systems 112, 118 offer web services 114, 116, 120 for use by the consumer application 104 in response to the web service calls 124, 126, 128.

The web service calls 124, 126, 128 may be performed by the proxy objects 106, 108, 110, as the proxy objects 106, 108, 110 may provide an interface for the consumer application 104 such that the consumer application 104 need only have an identification of a proxy object to call to initiate a web service call. Due to a separation between the application 104 and the proxy objects 106, 108, 110, for example, a run-time configuration of a first proxy object 106 may change to reflect changes to a policy for performing a web service call without having to change the consumer application 104.

The proxy objects 106, 108, 110 are configured during a configuration time phase and might be included in a deployment of the consumer application 104. The configuration may be performed during a configuration time phase due to details of a specific system landscape not being known during design-time such that configuration of parameters might need to be performed after deployment. For example, a destination of a web service call, which might be a network address being a uniform resource identifier including an internet protocol address of a provider system and a name of a component at the provider system, might not be known during design-time and may need to be determined during configuration-time for the proxy objects 106, 108, 110.

Consumer proxies may be object lasses (for example implemented in ABAP (ADVANCED BUSINESS APPLICATION PROGRAMMING) or JAVA). Consumer proxies may be generic or generated. Configuration both kinds of consumer proxies may be treated in the same way, with differences being only in how they are created in a design-time phase. A generation of consumer proxies may take place during the development (design-time phase)—not during configuration in the customer system. During a business configuration phase (e.g., in a customer system) a consumer proxy may get one or more run-time configurations, each of which are collections of settings. There may be several run-time configurations for one and a same proxy, as a run-time configuration may be specific for one provider system (e.g., a same proxy may be used for multiple provider systems using different run-time configurations).

When a consumer proxy is used for an invocation of a web service in an application program, a run-time instance of the consumer proxy object class may be instantiated with reference to one of its run-time configurations. For example, the first proxy object 106 may have a reference to a first run-time configuration that may be one of multiple run-time configurations in the run-time configurations 122.

In general, the consumer application 104 may implement part of a business process that is performed in concert by the consumer application 104 and the provider systems 112, 118. For example, the consumer application 104 may implement a business process related to order processing where the consumer application 104 calls a first web service 114 to add a customer to a customer database if the customer does not yet exist; and the consumer application 104 calls a second web service 116 to add the order to an order database; and the consumer application 104 calls a third web service 120 to cause a receipt to be generated for the order.

Run-time configurations 122 include a configuration of parameters to be used by the consumer system 102 during run-time. The run-time configurations 122 may include a collection of multiple run-time configurations to be used by the proxy objects 106, 108, 110, where there may be one or more run-time configurations for each of the proxy objects 106, 108, 110 and a run-time configuration may be specific to a proxy object of a provider system. The proxy objects 106, 108, 110 might not share run-time configurations and a proxy object may have different run-time configurations for different provider systems.

A run-time configuration in the consumer system 102 may be used by the consumer proxy objects 106, 108, 110 when making a web service call. For example, for the invocation of a specific web service a run-time configuration for a corresponding consumer proxy may contain a Uniform Resource Locator (URL) of the web service to be used for the invocation.

Each of the provider systems 112, 118 include run-time configurations 132, 130, and each of the run-time configurations 132, 130 may be a collection of run-time configurations for web services in the respective provider systems 112, 118.

In a provider system, such as one of the provider systems 112, 118, run-time configurations of a web service may describe a way in which the provider systems 112, 118 accept invocations of the web service and how it will behave during the invocation. For example, a run-time configuration of a specific web service may describe a type of authentication that is accepted for invocations of that web service, that all calls are stateful, and a session cookie to be used to identify the sessions for stateful processing.

A run-time configuration for a web service may be derived from design-time attributes of the web service, policies in an applied configuration profile (profiles are discussed in more detail below), or both.

A run-time configuration for a consumer proxy may be derived from a combination of one or more of a technical description of a corresponding web service (e.g., a Web Services Description Language (WSDL) file containing a URL for an invocation of the web service), settings for a destination (e.g., a user identifier and password of a destination template), settings in a profile referenced in the destination (the relevant settings may already be contained in the technical description of the web service), and design-time attributes of the consumer proxy (e.g., rules on how to interpret a WSDL file of a web service).

Figure 2:
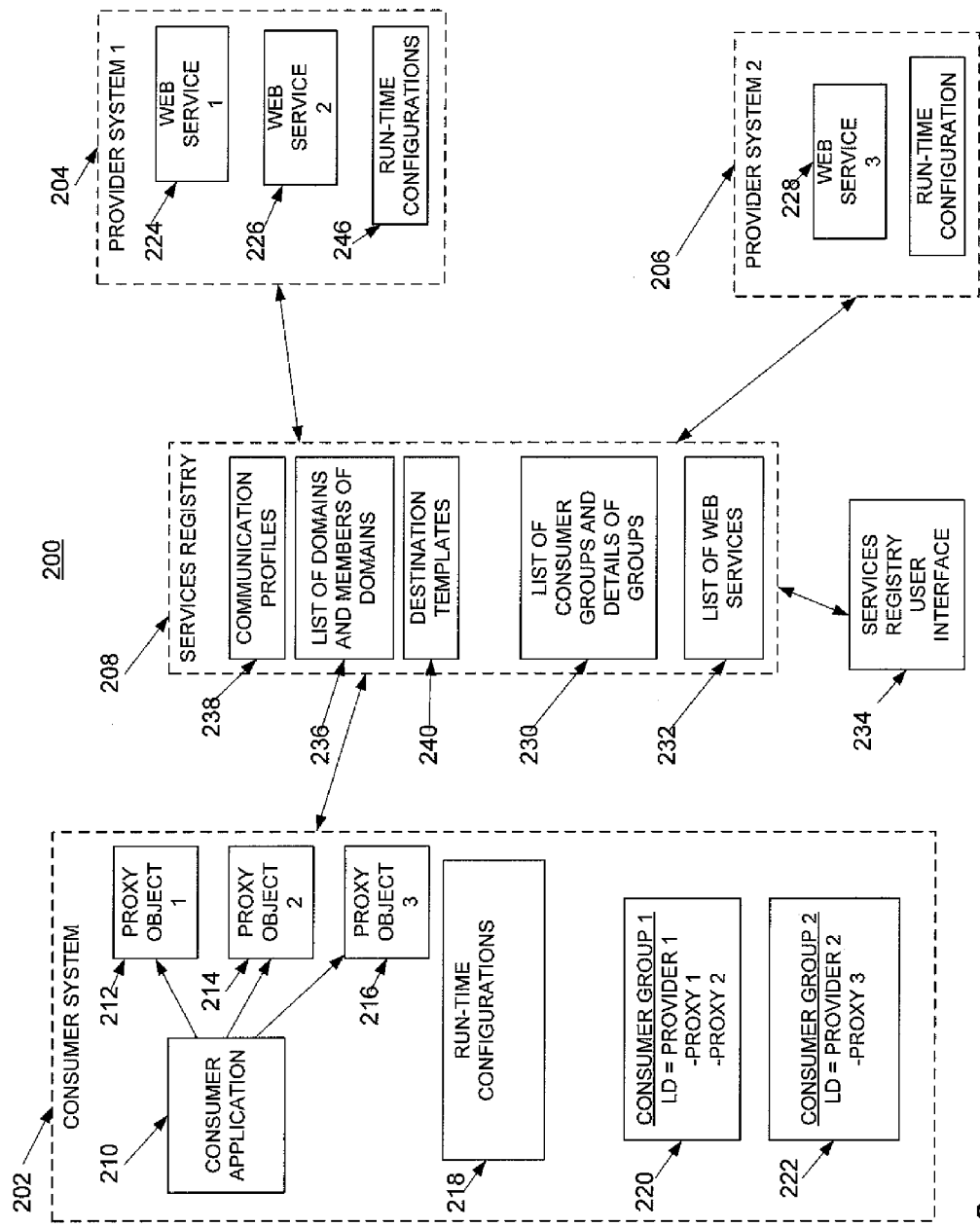
FIG. 2 is a block diagram of a system landscape of consumer and provider systems to interact with a services registry at configuration time.

FIG. 2 is a block diagram of a system landscape 200 of consumer and provider systems 202, 204, 206 to interact with a services registry 208 at configuration time. In general, configuration time may be split into two types of configuration phases, a technical configuration phase performed by a technical administrator and a business configuration phase performed by a business administrator. Configuration time may involve taking a set of consumer and provider systems 202, 204, 206, and configuring them with assistance of the services registry 208 such that the consumer and provider systems 202, 204, 206 may interact during run-time. For example, a combination of settings might not be set for consumer system 202 during design-time and those settings may need to be chosen during configuration time such that components of the consumer system 202 may operate properly (e.g., such that web service calls may be made to an appropriate provider system in accordance with desired security settings). During run-time, the consumer system 202 and the provider systems 204, 206 may interact as the consumer system 102 and the provider systems 112, 118 of the system landscape 100 interact with reference to FIG. 1.

As discussed above, a configuration phase may be required as details of a system landscape of deployed systems might not be known during design-time of components of the system landscape. As examples, host names (e.g., a name of a web service provider assigned to a system in a system landscape directory or a technical, network address of a web service provider); account management details for users of the system landscape (e.g., logon procedures, user identifiers and passwords, and the like); a distribution of deployment units in the system landscape; security policies of a system landscape to be specified in a deployment (e.g. a customer may wish to only use HyperText Transfer Protocol over Secure Socket Layer (HTTPS) for communications between systems in a system landscape); and the like.

In addition to details of a system landscape not being known during design-time, control over portions of the system landscape may be desired to be left until a deployment. As examples, control of opening of inbound interfaces, activation of calls to web services (including web services external to a system landscape), and a wide area network-connection inside a system landscape may be left until deployment. Before the business configuration in a service provider system none of its web services may be called (with an exception of some technical web services that may always be necessary, such as web services used during the web service configuration itself).

Control of opening of inbound interfaces may refer to a business administrator keeping control over a set of "open inbound interfaces" (e.g., callable web services), as he or she may decide which business processes are established and which are not. During business configuration, run-time configuration may be generated only for those web services which are part of business processes a business administrator wants to enable. If a web service is provided by a system, there remains a risk that it might get misused. By making sure that only those web services are provided that are part of a business process, the risk of misuse may be minimized.

Technical configuration may involve adding a system to the system landscape 200 such that the added system is visible to the services registry 208, the services registry 208 has information about the added system, and the services registry 208 may interact with the added system. Each of the systems in the landscape 200, such as the consumer and provider systems 202, 204, 206 is a technical system in the sense of a system of a system landscape directory. A system, which is relevant for web service configuration, may be identified by its database instance. In a client-server environment, several application servers (providing their processors for calculations) may share a same database instance such that they behave like one system, although they may, for example, have different Internet Protocol addresses. Architecture of a system landscape may be "client-enabled", such that it may allow for splitting of an amount of business data into several "clients" that are completely separate from a business point of view. Thus, from a web service configuration perspective, each "client" in a database instance may be a system of its own.

As part of adding a system to the system landscape 200, the services registry 208 may maintain a reference to the system in a list of systems. The reference to the system may be an identifier of the system taken from a system landscape directory (identifying a client in a database instance). In addition to maintaining a reference to the system, the services registry 208 may store for each system parameters of a web service connection to that system.

In addition to adding a system to a list of systems, information from a system may be published in the services registry 208. Information published in the services registry 208 may include a list of what may be referred to as consumer groups of a consumer system; a list of services, including descriptions of those services and other design-time attributes of those services, offered by a system that acts as a provider system; and physical descriptions of a system. As an example, the consumer groups 220, 222 may be published by the consumer system 202 to the services registry 208 and stored in the repository 230 of a list of consumer groups and details of the consumer groups. As another example, and each of the provider systems 204, 206 may publish descriptions of the web services 224, 226, 228 to the services registry 208, for which a reference may be stored in the repository 232 of the list of web services. A reference to a description of web services 224, 226, 228 may be, as an example, a URL referring to a web service description. The description of web services may be referred to as service descriptions, and each service description may include a set of documents that describe an interface to and semantics of a service (e.g., a list of methods for invoking the service, a list of parameters required for the methods, a list of types of results returned by calling a method of a service, and the like) and the service description may be in a format, such as a format in accordance with WSDL. In variations, service descriptions may be stored instead of a reference to a service description.

Design-time attributes of a web service may include one or more of a service definition name (which may be a name of a design-time part of a web service in a development environment), a qualified name of a port type (which may identify an interface of a web service independent of an implementing programming language), an identifier of the provider system of the web service in a system landscape directory, and classification information of the development object of the web service (which may include classification values such as values describing a deployment unit and process component to which a web service belongs). The classification information may be in accordance with the Universal Description, Discovery and Integration (UDDI) standard, and classification information may include a combination of an identification of a classification taxonomy and classification codes for a web service. The design-time attributes may be included in the service description.

Classification information for consumer groups may also be published to the services registry 208 and that information may also be in accordance with UDDI.

In addition to adding design-time attributes of services to the services registry 208, attributes of configured web services may be added to the services registry 208 during configuration time (e.g., during a business configuration). These attributes may include one or more of a qualified name of the service from a service description (e.g., in a WSDL document), a qualified name of a binding/endpoint in the service description (e.g., in a WSDL document), and a URL for an invocation of the configured web service.

As part of adding a system to the system landscape 200, a destination template may be generated for each system that acts as a provider system. For example, a destination template may be generated for each of the first provider system 204 and the second provider system 206, and the destination template may be stored at the registry 208 in a repository 240 of destination templates. The destination template may describe access into a system and may be used for configuration of consumer proxies. For example, a destination template may contain properties of a destination that may be stored as part of a run-time configuration of a consumer application, such as in one of the run-time configurations 218. During business configuration in a consumer system a consumer group may be configured for one or more destination templates. In such a scenario, the destination templates may point to different provider systems (e.g., they may be required to point to different provider systems when a same consumer group is configured for multiple destination templates) and the provider systems must be compatible with a placeholder destination, which may be referred to as a logical destination, of the consumer group. The configuration of the consumer group may result in run-time configurations for its consumer proxies. For each of these run-time configurations knowledge may be kept about which consumer group and which provider system a run-time configuration has been generated.

A destination template may only contain information about a provider system that may be independent of web services offered by that provider system. For example, a destination template may contain a user identifier and password that may be used for the invocation of web services which require this kind of authentication. If a web service does not require any authentication at all, then a run-time configuration of its consumer proxy might not contain a user identifier and password. A run-time configuration of a consumer proxy may include a URL used to invoke a web service. As this URL is web service specific, it might not be contained in a destination template, but in a service description of the web service.

In addition to adding a system to the system landscape 200, a system may be added to a configuration domain, which may be referred to as a "domain." A domain may define a group of systems assigned to the domain, where the domain may have a communication profile that describes one or more security policies for systems in the domain to be used while communicating with other systems in the domain. For example, the consumer and provider systems 202, 204, 206 may be assigned in a technical configuration phase to a same domain, where the domain has a profile prescribing a policy that the systems in the domain communicate using HTTPS. In accordance with that profile, the consumer system 202 may send web service calls using HTTPS to the provider systems 204, 206. In particular, proxy objects that send web service calls may implement and use the HTTPS protocol when making web service calls.

The profile of a configuration domain may contain security settings and non-security settings. Security settings included in a configuration domain may include, as an example, a set of admissible authentication techniques for a web service connection between systems of the domain (e.g. HyperText Transfer Protocol (HTTP) basic authentication with a user identification and password, a Security Assertion Markup Language (SAML) assertion, a digital certificate (e.g., in accordance with X.509), and the like). Non-security settings may include, as examples, several timeout parameters (e.g., for a WS-RM protocol), decisions about a mechanism used for stateful web services (e.g., HTTP cookie or URL-rewriting), and the like. Additionally, a profile may further include default settings for destination templates of a domain, such as a hostname and HTTP port of an HTTP proxy server for remote connections.

Systems may be added to one or more domains, such that a system may adhere to different policies for different interactions with other systems in a same domain or different domains. Where multiple systems are members of a set of multiple, common domains, a rule may determine a profile to which the systems adhere and a profile of a domain may be adhered to in entirety to the exclusion of any policies of other profiles. For example, if two systems are members of a same two domains, a rule may indicate that a profile of the domain having the strictest security policies is to be adhered to by the two systems when the two systems communicate with each other (e.g., when one systems requests services from the other) and a technique may have ways of determining which security policies are stronger (e.g., encryption strength having a larger number of bits may be considered stronger). As another example, domains of profiles of policies may have associated rankings such that there is a rank order among domains and a rule may dictate that for a connection between two systems that share multiple domains, a domain with the highest ranking is to be applied. Ranks of domains may be assigned by a technical system administrator, may be determined based on a chronological ordering of generating domains (e.g., a domain generated earliest may have a highest ranking), or some other criteria. The services registry 208 or the consumer system 202 may store ranking information to make a determination as to a policy to apply. In some implementations, rather than dealing with multiple domains by determining a single domain of which policies of a profile are to be adhered, policies of multiple profiles may be applied on a policy by policy basis. For example, all policies that do not conflict may be followed and conflicts between policies may be handled. For example, there may be rules for dealing with conflicts between two policies that direct different techniques of authentication.

Information related to domains may be stored at the services registry 208. For example, a list of domains and members of domains may be stored in a repository 236 of a list of domains and members of domains, and profiles for domains may be stored in the repository 238 of communication profiles at the services registry 208.

Profiles of a domain may be distributed to consumer and provider systems 202, 204, 206 such that policies of a profile may be implemented in a run-time configuration of the systems. For example a profile of a domain including the consumer system 202 and the first provider system 204 may be stored at the repository 238 of communication profiles, and that profile may be distributed to the consumer system 202 and the first provider system 204 for inclusion in the run-time configurations 218, 246. Distribution of profiles might not occur until a business administrator initiates configuration of systems in the system landscape 200.

In addition to having a profile for a domain, default settings of destination templates may be added to a domain and there may be default destination template settings (e.g., hostname and HTTP-port of a HTTP-proxy-server for remote connections) established for each system in the domain that may act as a provider system.

In contrast to a technical configuration phase that may focus on adding systems and related information to the services registry 208, a business configuration phase may focus on selecting web services to be used for one or more business processes. The selection of web services may result in triggering configuration of the selected web services and consumer proxies for the selected web services. For example, while a technical configuration phase may result in a combination of systems being added to the system landscape 200 with domains being set-up, destination templates being configured, profiles being configured, profiles being associated with domains, and the like, a run-time configuration of consumer and provider systems might not be generated until a business configuration phase. With this separation, a technical configuration phase need not take into account any business processes to be implemented in a business configuration phase. For example, during the technical configuration phase, systems may be added to domains based on considerations other than an implementation of a business process.

To determine which web services need to be used for one or more business processes, consumer groups of an application may be used in combination with a classification of web services. The process of determining web services may be as follows. When a web service is published in the services registry 208, it may also be classified according to an application area to which it belongs (e.g., based on classification information published to the services registry 208). From this classification, the services registry 208 may derive a classification of provider systems according to the application areas for which they provide web services. In the consumer system 202, all web services consumed by an application are grouped into consumer groups 220, 222 and each of the consumer groups 220, 222 references a logical destination. The logical destination may describe an application area that the consumer group expects in the provider system (e.g., a name of a logical destination may be the description of the application area or a logical destination may have attributes describing the application area). Each logical destination may be mapped onto a value of an application-area-classification of provider systems in the services registry 208. When a consumer group has to be configured, at first a logical destination of the consumer group may be used to get a set of provider system candidates. Then, each of these candidates may be checked to see whether it provides all web services requested by the entries of the consumer group.

If there is a classification for web services in the registry 208 according to an industry-specific extension, then this classification may also be used for the determination of the web services to be consumed. For example, a consumer group may contain information about an extension it requests, and the classification of web services may be used for the selection of possible provider systems.

Classification information in the services registry 208 may also support a search for consumer groups belonging to a (consumer) application. For example, there may be a classification of consumer groups in the services registry 208 according to an application to which the consumer group belongs.

For example, the repository 230 having a list of consumer groups and details of consumer groups may be used to list web services associated with an application that implement part of a business process. A business administrator may select the application as an application to be activated, may select destination templates for the web services of the consumer groups associated with the application, and, the services registry 208 may trigger configuration of the web services, consumer applications, and configuration of consumer proxies of the application. For example, the services registry 208 may cause the run-time configurations 218 of the proxy objects 212, 214, 216 to be generated.

As another example, the consumer application 210 may implement a business process such that configuration of the consumer system 202 and web services called by the consumer application 210 may result in configuration of all systems of the business process. Thus, consumer groups of an application may list all necessary consumer proxies and web services to be configured for a business process. For example, the consumer groups 220, 222 may include a listing of consumer proxy identifiers, which may be used to determine which consumer proxies need to be configured, and the consumer proxies may be used to determine types of web services that are called by an application. Based on the type of web services that are called by an application, a mapping of a placeholder destination of a consumer group to a physical destination may determine specific web services that are to be configured for being called by the consumer proxies. The identification of consumer proxies and determination of web services that are called by consumer proxies may determine all consumer proxies and web services that need to be configured for a business process.

In general, in a business configuration phase a business administrator might not be informed of domains of systems, but may be informed of names and roles of the systems of the system landscape 200. For example, a business administrator may be aware that the consumer system 202 has applications the business administrator desires to activate, and the business administrator may select that system through the services registry user interface 234 for activation. In response to that selection, the services registry 208 may send to the services registry user interface 234 a list of systems that may interface with the selected system to provide web services (e.g., the services registry 208 may use a list of consumer groups to build a list of possible provider systems in a same domain as a selected consumer system, and a business administrator may select one or more provider systems to activate, which may cause configuration of those systems).

As described above, the services registry 208 stores a variety of information related to the service consumer and service provider systems 202, 204, 206. In this role, the services registry 208 may act as a central repository for storage and distribution of information related to services in the system landscape 200, in addition to assisting configuration of components of the system landscape 200. To assist configuration of components of the system landscape 200, when a system is added to the services registry 208, the services registry 208 may have services for communicating with components. For example, the system registry 208 may have a service to assist in generating the run-time configurations 218 at the consumer system 202.

Management of the services registry 208 may be provided through a services registry user interface 234. For example, both a technical and business administrator may use the services registry user interface 234 to configure components of the system landscape 200 through the services registry 208, as described above. For example, a business administrator may select an application and web services consumed by the application to be activated and the services registry 208 may cause configuration of the application and the web services (e.g., by generating run-time configurations for consumer proxies for the application).

In addition to managing addition of systems and configuration of systems, the services registry 208 may manage changes in the system landscape 200. Changes may include, as examples, removal of a system from the system landscape 200, removal of a system from a domain, removal of a domain, modifying a communication profile of a domain, and the like.

As an example of how a communication profile may be modified, a user of the services registry 208 may make modifications to an existing profile or select another profile to replace an existing profile for a set of systems (e.g., for a set of systems in a domain). The new profile may be distributed to consumer and provider systems, and a new run-time configuration may be generated for consumer and provider systems. If a consumer system is not communicating with an older profile or old run-time configuration, the old profile and old run-time configuration may be replaced with new versions based on the new profile.

As components of some consumer systems may be communicating using the older profile and the old run-time configuration, those components may be allowed to continue communicating using the older profile while the new profile may be used for other components that are not communicating with the older profile (e.g., the old profile may be used in parallel with the new profile). For example, while some proxy objects continue to communicate with an older profile and older run-time configuration, other proxy objects may communicate with the new profile and new run-time configuration. If a component that was communicating with the older profile stops communicating with an older profile (e.g., a conversation ends), the new profile may be activated for that component. This may continue until all components of a consumer system no longer use the old profile. Then, the old profile and old run-time configuration may be deleted in lieu of the new profile and new run-time configuration. Determining whether an old version of a profile is used by a consumer system may be performed by a consumer system itself.

As an example, if an old version of a profile is used for simple, stateless, synchronous calls, a new version may be applied for a next, following call. As another example, if a profile is used in a stateful connection or in a sequence, such as a Web Services ReliableMessaging (WS-RM) sequence, a wait may be performed for completion of all open sequences if a modification of the profile is not ensured to not affect settings of the sequence.

If all consumer systems in a domain no longer have the older profile, the old profile may be deleted from all provider systems. In this fashion, profiles may be updated without adversely affecting web services using an older version of a profile (e.g., web service connections need not be dropped). In addition, the change process may run completely automatically as the change process may be controlled by the services registry 208 (e.g., by requesting adoption of an updated profile at a consumer or provider system). If a system requires human-involvement to set a new profile, service providers and service consumers may automatically be included in the process by, for example, automatically generated e-mails to human administrators containing deadlines for completion of their change management tasks.

Removing a system from a domain may include a technical administrator selecting a system to remove from a domain and the services registry 208 removing an association between a system and a domain. If a system to be removed is a provider system and the provider system is a member of other domains, a determination may be made as to remaining domains that may be in common with consumer systems that are configured to interact with the provider system. Profiles of other domains may be used for a configuration of interactions between the provider system and the consumer systems that are configured to interact with the provider system. In some implementations or deployments, there may be a "global" domain, which contains all systems of a system landscape and which has a lowest preference. The policies of this domain may describe a "least common denominator" of conventions for web service connections. In such a scenario, a domain may always be available for connections.

If a system to be removed is a provider system and the provider system is not a member of other domains, the services registry 208 may remove destination information related to a system. Removing destination information related to a system may include removing a destination template at the services registry 208. Another system may be used to replace the removed system, which may involve searching repositories of the services registry 208 for systems that can replace the system (e.g., if a provider system is removed, searching for other destinations), and configuring a replacement. For example, if a system that is removed is a provider system, a provider system that may perform services for consumer systems may be searched and destination information for a replacement provider system may be distributed to the consumer systems. For example, a domain may be searched for replacement provider systems which may have classification information and service descriptions that match services needed for consumer systems that used the removed system.

The consumer groups 220, 222 are developed during design-time and shipped with an application that acts as a consumer. For example, the consumer groups 220, 222 may have been developed and shipped with the consumer application 210. Development of a consumer group may be performed manually through a text editor. In general, a consumer group contains a placeholder destination of a provider system and a group of service calls to the provider system from a consumer application. Thus, development of a consumer group may include naming a placeholder destination and making a list of web service calls an application makes to the placeholder destination. Web service calls may be identified in a consumer group by a consumer proxy identifier, which may be an identifier that references a proxy object that can be used to make a web service call to a destination. Thus, a placeholder destination and a collection of proxy identifiers may make up a consumer group.

The placeholder destination may be referred to as a logical destination, which may be a name of a destination that is used during design-time but does not correspond to a system of a system landscape during run-time. In this manner, the logical destination may be used to refer to a destination for which a name or information about which is not available, as information about the destination might not be available until configuration time (e.g., at a customer system landscape, such as the landscape 200). Thus, the name may be used, at design-time, to consistently refer to a destination that has yet to be identified which may simplify design and configuration of an application and web services the application calls. For example, as a single name may be used to refer to a destination in multiple web service calls, the configuration of a system landscape may consistently cause that name to be mapped to a destination of a system landscape at configuration time.

A destination to which a logical destination is to be mapped may be a component of a system at which a web service call may be received and serviced. The destination may be represented by what may be referred to as a destination template, such as one of the destination templates 240. A destination template, as described above, may describe how to access a specific provider system (e.g., an actual destination) from the consumer system. The destination template may include one or more of logon information (such as a user identification and password) used for invocation of web services in the provider system; a URL for a Web Service Inspection Language (WSIL) document that contains information about every web service offered by the provider system and may be used if no services registry (such as the services registry 208) is available; logon information to access metadata about one or more web services offered by the provider system (which may be used to retrieve a service description document with a URL that has been found in a services registry or in the document offered by the WSIL service of the provider system); a reference to a configuration profile (e.g., including a profile version); and configuration parameters used in a consumer system (e.g., a hostname and HTTP-port of an HTTP proxy server (a configuration profile may contain default values of these configuration parameters valid for all destination templates of its configuration domain).

The mapping of a logical destination to a destination template of a system landscape may be performed during a business configuration phase. For example, in response to a business administrator selecting a provider system to be configured for a consumer system, destination information related to the provider system may be used to generate settings of a run-time configuration at a consumer system and that run-time configuration may be used by a proxy object of a consumer application to make a web service call to a component of the provider system.

As discussed above, a run-time configuration may be generated as part of a configuration phase, and, in particular, as a result of a business configuration phase. In addition to including destination information, a run-time configuration, such as one of the run-time configurations 218 of the consumer system 202, may include other parameters to assist with making web service calls. A run-time configuration of a web service of a provider system may be based on a combination of design-time properties of a web service (e.g., design-time properties of a provider system service may be transposed to a run-time configuration at a provider system), policies in a profile (e.g., a security profile of a domain), rules deployed with a web service, and the like. A service provider may have multiple run-time configurations, including different run-time configurations for different profiles (e.g., for different domains) and different versions of a profile (e.g., older versus newer security profiles). A run-time configuration of a consumer proxy of a consumer system may be based on design-time properties of the consumer proxy, security policies of a web service destination, additional settings for the provider system in the web service destination, a service description for a web service, and rules deployed with a consumer application.

In general, the generation of run-time configurations for a web service takes place in its provider system. For example, the run-time configurations 246 of the first provider system 204 may be generated at the first provider system 204. To be callable, a web service may need at least one run-time configuration. There may be several run-time configurations for a web service. For example, the first web service 224 of the first provider system 204 may have multiple run-time configurations stored in the run-time configurations 246. Each of the run-time configurations may correspond to, for example, different settings used when being called by different consumer proxies of different domains. A URL used for an invocation of a web service may specify a run-time configuration to be used.

A run-time configuration of a web service may be generated from a combination of design-time attributes of the web service and a configuration profile of a configuration domain of which a provider system is a member. Rules used to derive a run-time configuration may be specific to a certain technical kind of web service and might not be changed by configuration in a deployed system (e.g., a customer system). Thus, reference to applicable rules may be part of design-time attributes of a web service.

Examples of settings derived from design-time attributes and a configuration profile may include session state settings, timeout settings, HTTP settings, and security settings. Those settings may become part of a run-time configuration of a web service at a provider system.

For example, in general, web service calls may be stateless. Thus, if a web service is called several times, execution of the calls occurs independent of each other, even if the calls are from a same application run-time context. Settings for stateless calls may be part of design-time attributes that become part of a run-time configuration.

Web service calls may also be stateful. For such a scenario, there may be a design-time attribute of a web service that activates stateful processing of the web service. After the processing of a web service call a run-time environment of stateful calls may be kept for future calls from the same application run-time context. Two alternative technologies for stateful web service calls may include cookies and URL re-writing. As a web service behavior may be different depending on a chosen technology, a technical administrator may decide which technology to be used. Activation of stateful processing may be a design-time attribute of the web service, a configuration profile may contain an entry that indicates which technology to be used for stateful calls between systems of a corresponding configuration domain, and a run-time configuration setting may depend on a combination of the design-time attribute and the configuration profile entry. If stateful processing is activated, then a technology chosen in a configuration profile may be applied to a run-time configuration setting.

As another example, there may be several timeout values that control reliable processing of a web service according to a standard WS-RM that may be part of run-time configuration settings. A combination of design-time attributes and attributes of a configuration profile may be used for configuration of WS-RM. As examples, design-time attributes may specify which web service operations are processed according to WS-RM and a configuration profile may include corresponding timeout values. Generating run-time configuration settings may include, if design-time settings indicate that WS-RM processing was activated, timeout values. Otherwise, for example, no timeout settings may be included in a run-time configuration.

As another example, HTTP settings may be part of settings of a configuration profile. For example, a configuration profile may contain entries about an HTTP proxy host and a corresponding HTTP port that are used as default settings for corresponding settings in destination templates referencing a version of the configuration profile. However, these settings may have no effect on a run-time configuration of a web service provider.

As another example, there may be security settings from design-time attributes and a configuration profile that may become part of a run-time configuration. For example, there may be several techniques available for transmission security and authentication of a user consuming a web service (e.g. HTTP basic authentication with user identifier and password, SAML assertions, or X.509). A configuration profile may describe a subset of authentication techniques that are allowed for web service invocations between systems of a configuration domain. As security requirements may be different for different web services, some web services might not need any kind of authentication technique, while others may need a strong authentication technique. A minimal authentication level may be a design-time attribute of each web service with possible values such as "none", "basic" and "strong". For transmission security there may be another design-time attribute with possible values such as "none" and "both" (e.g., for confidential transmission and integrity)). Security preferences of a web service may be set as design-time attributes.

For example, if w1 is a web service that requires neither authentication nor transmission security, w2 is a web service that requires at least basic authentication, and w3 is a web service that requires a strong technique of authentication, all three web services may be configured with a same configuration profile p that offers basic authentication, SAML assertions, and allows for web service calls without authentication.

As each web service may have different design-time attributes, a combination of design-time attributes and a same configuration profile may result in three different run-time configuration settings. For example, a run-time configuration of w1 may enable invocation of w1 without any authentication, a run-time configuration of w2 may enforce at least basic authentication, and a run-time configuration of w3 may enforce SAML assertions. If the configuration profile did not allow for web service invocations without authentication, then a resulting run-time configuration of w1 may enforce at least basic authentication. If the configuration profile did only allow for web service invocations with SAML assertions, then the configuration of w1, w2, and w3 may get run-time configurations that only allow for calls with this strong authentication method.

Generation of a run-time configuration for a consumer proxy may take place in a consumer system. In general, a run-time configuration of a consumer proxy may depend on content of service description of a corresponding web service (e.g., a WSDL document referred to in the services registry 208), settings of a destination template for a provider system, and a configuration profile referenced by the destination template.

Generation of a run-time configuration may include (a) retrieving URLs of service descriptions corresponding to a port type of a web service from the services registry 208 or from a WSIL document of a provider system (logon data for these metadata requests including the URL for the WSIL document may be contained in a destination template for a provider system); (b) for each URL retrieved, (i) the consumer system may try to retrieve and understand a corresponding service description (e.g., a WSDL document corresponding to a URL corresponding to a port type of a web service), (ii) try to generate a run-time configuration for the consumer proxy, and continue (i) and (ii) until a successful attempt to generate a run-time configuration.

Generation of run-time configuration for a specific service description (e.g., WSDL document) may include replacing provider properties in a service description with corresponding consumer properties for the run-time configuration, and enriching the run-time configuration with settings taken from a destination template, its referenced configuration profile, or both (e.g., enriching a run-time configuration with a user identifier and password from the destination template, the proxy host and port from the destination template, or default settings from a configuration profile).

Although the description of FIG. 2 describes technical and business configuration with respect to a technical administrator and a business administrator such that the two administrators may be two different users, that need not be the case and a split between technical and business configuration may still be beneficial. For example, by separating the technical configuration from business configuration, details of technical configuration need not cause a context of a business process being configured during business configuration to be lost, as the business configuration may be more focused towards those aspects related to activating applications of a business process than technical configurations of systems.

Figure 3:
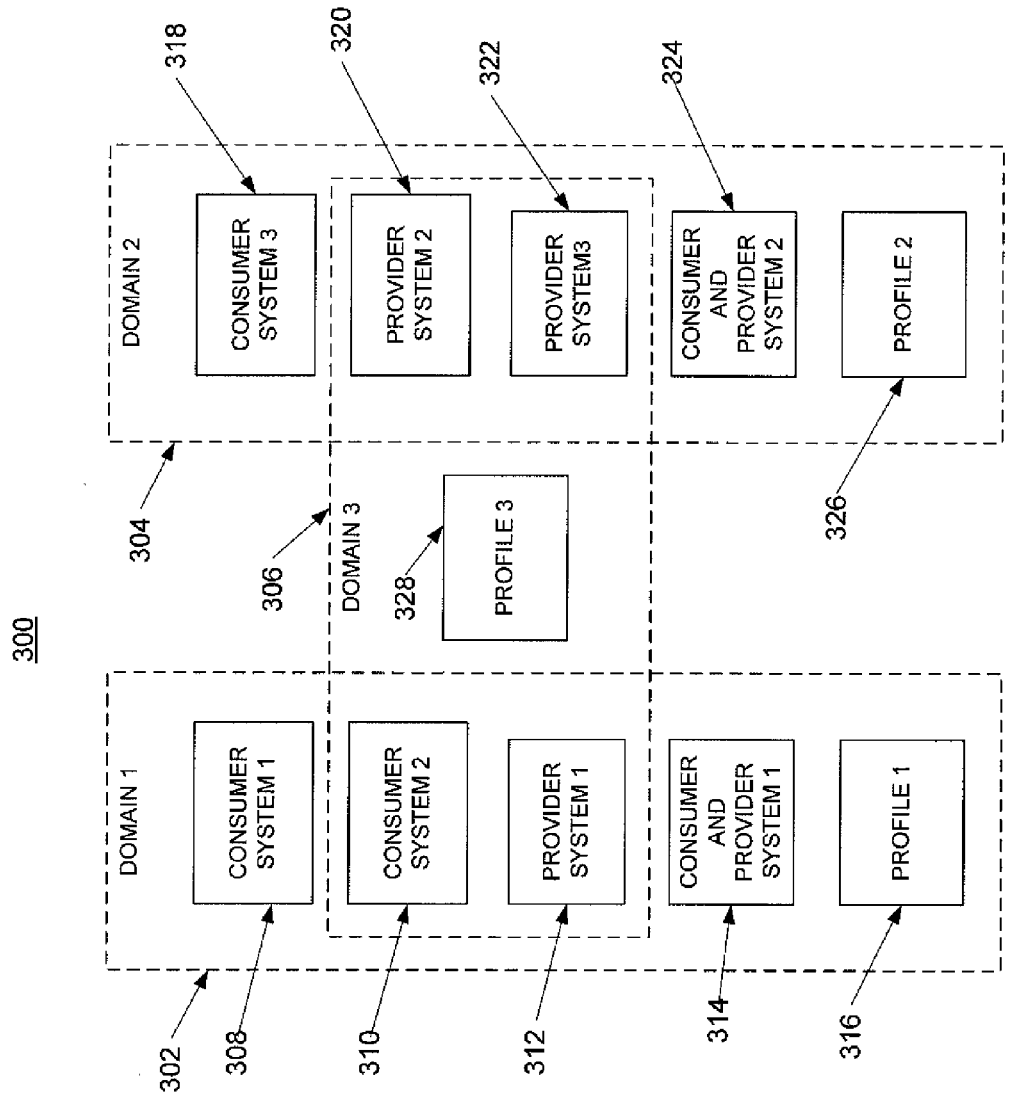
FIG. 3 is a block diagram illustrating domains of a system landscape.

FIG. 3 is a block diagram illustrating domains 302, 304, 306 of a system landscape 300. Components of the system landscape 300 of FIG. 3 may be similar to those of the system landscape 200 of FIG. 2 or the system landscape 100 of FIG. 1. For example, the consumer and provider systems of the domains 302, 304, 306 may be similar to the consumer and provider systems of FIG. 2.

In general, each of the domains 302, 304, 306 is a grouping of systems belonging to a domain and has a profile. For example, a first domain 302 includes a first consumer system 308, a second consumer system 310, a first provider system 312, a first consumer and provider system 314, and a first profile 316. As another example, a second domain 304 includes a third consumer system 318, a second provider system 320, a third provider system 322, a second consumer and provider system 324, and a second profile 326. And, as another example, a third domain 306 includes the second consumer system 310, the first provider system 312, the second provider system 320, the third provider system 322, and a third profile 328.

A system may be included in one or more domains. For example, the first consumer system is only in the first domain 302. As another example, the second consumer system 310 is in the first domain 302 and the third domain 306.

A profile of a domain may describe a collection of one or more policies for systems of the domain. The policies of a profile may only apply to interactions between systems in a domain. For example, the third profile 328 may include a combination of policies describing security settings for communication between systems in the third domain 306. For example, the third profile 328 may apply to service calls from the second consumer system 310 to the first provider system 312; however, the third profile does not apply to interactions between the first consumer system 308 and the second provider system 320 as they are not both in the third domain 306.

For systems in multiple domains, rules may determine which profile is to be applied. For example, a rule may prescribe that a profile of a domain with a higher ranking is to be applied. In that example, a ranking may be associated with domains based on a time of generation of a domain, where an earlier-generated domain has a higher ranking. For example, if the first domain 302 is generated after the third domain 306, when the second consumer system 310 and the first provider system 312 interact, the third profile 328 of the third domain 306 may be applied.

Application of profiles of domains may be part of a process of generating run-time configurations for systems. For example, during a business configuration phase, a business administrator may select to activate an application of the third consumer system 318, which has a consumer proxy that is to call the second provider system 320. As a result of that selection, a run-time configuration may be generated for the consumer proxy and a run-time configuration may be generated for the web service. The second profile 326 may be applied when generating a run-time configuration for the consumer proxy of the third consumer system 318 and the second profile 326 may be applied when generating a run-time configuration for the web service to respond to call from the consumer proxy.

A profile may be changed and an updated profile may be implemented in updated versions of run-time configurations. For example, as described with reference to FIG. 2, an old version of a profile may be replaced with a new version by having new versions of run-time configurations phased into each system of a domain. For example, a user may start a technical configuration phase to configure a profile while systems are being run, and, the user may save a new profile while may be phased-in across systems using the old profile (e.g., by generating new run-time configurations based on the new profile to be used by systems using run-time configurations based on the old profile).

Although not shown, a domain and its profile may be stored at a services registry, such as the services registry 208 of FIG. 2. Storing of the domain may include storing a list of systems in a domain along with a profile to apply to systems when interacting in the domain.

Figure 4:
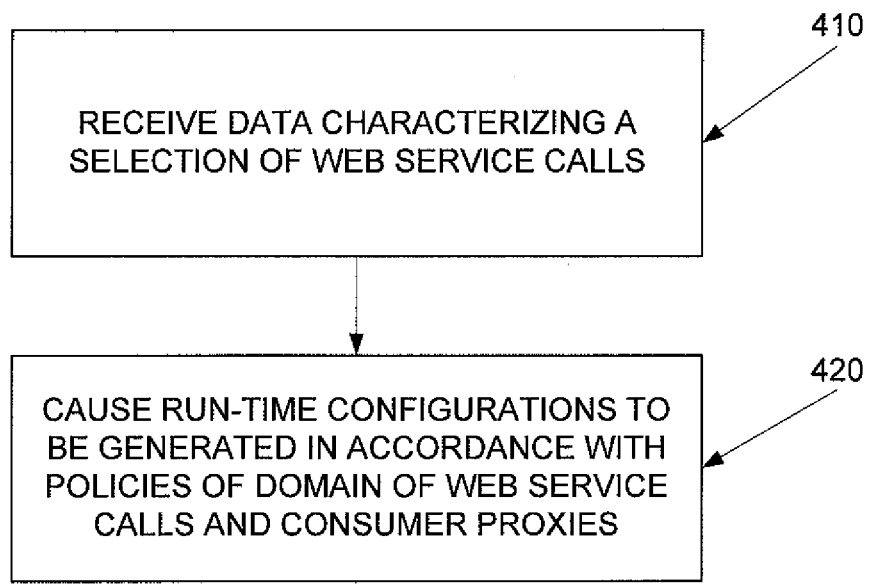
FIG. 4 is a flowchart of a process to cause run-time configurations to be generated in accordance with policies of a domain.

FIG. 4 is a flowchart of a process 400 to cause run-time configurations to be generated in accordance with policies of a domain. The process 400 may be implemented in the system landscape 200 of FIG. 2 or landscape 300 of FIG. 3, and may be performed, for example, during a configuration phase. In general, the process involves receiving data characterizing a selection of web service calls (410), and generating a configuration for web service calls and their proxies based on a domain of web service calls (420).

Data characterizing a selection of web service calls (410) may include, as an example, a list of web service calls. For example, an application may be selected for activation by a business administrator and a list of web service calls made by the application may be generated. For example, definitions of services called by design-time proxy classes (that may be used to generate a proxy object) may be published by a consumer system in a services registry (e.g., as consumer groups) and a search of web services called by a consumer system may be made to generate a list of web service calls. That list may be received by a component of a services registry as data characterizing a selection of web service calls.

A configuration for web service calls and their proxies is caused to be generated based on a domain of web service calls (420). For example, based on the web service calls characterized by data received at 410, a determination may be made for a domain common to web services at one or more provider systems to receive the calls and consumer proxies of one or more consumer systems to make the calls. If there is more than one domain common to both the provider and consumer systems, a determination of which domain to use may be made (e.g., based on a comparison of rankings). Based on a determination of a domain to be applied for configuration, policies of a domain in combination with other information may be used to generate run-time configurations for web services and consumer proxies. The run-time configurations may be caused to be generated, for example, by sending a message from a services registry to consumer and provider systems indicating to generate the configurations in accordance with a selected profile.

The combination of information used to generate settings that are part of a run-time configuration for a web service and a run-time configuration of a consumer proxy may differ, as described above with reference to FIG. 2. For example, a run-time configuration of a web service may be generated from a combination of design-time attributes of the web service and a profile of a domain of which a provider system is a member. Rules used to derive a run-time configuration may be specific to a certain technical kind of web service and might not be changed by configuration in a deployed system (e.g., a customer system). Thus, reference to applicable rules may be part of design-time attributes of a web service. As another example, a run-time configuration of a consumer proxy may depend on content of service description of a corresponding web service (e.g., a WSDL document referred to in a services registry), settings of a destination template for a provider system, and a profile referenced by the destination template.

Although FIG. 4 includes a certain combination and type of sub-processes, the process 400 may involve fewer, different, or additional sub-processes.

Although FIGS. 1-2 and 4 are referenced with discussions of consumer and provider systems, a system need not be limited to being solely a consumer or solely a provider system. For example, a system may act as both a consumer and provider system by consuming web services and offering web services, as shown in FIG. 3.

Although each of the figures describes a certain combination of features, implementations may vary. For example, additional, different, or fewer components may be included in the system landscape 200 of FIG. 2.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:

1. A computer program product, tangibly and non-transitorily embodied in a computer-readable storage device, the computer program product being operable to cause one or more data processing computing devices to perform operations comprising:

receiving data characterizing one or more web services that are offered by a provider system and that are designated for activation for use in a group of systems, the group of systems comprising the provider system and a consumer system that calls at least one of the one or more web services via one or more consumer proxies in communication with the provider system and the consumer system, the provider system and the consumer system being configured prior to run time according to a technical configuration, the technical configuration preparing the group of systems for configuration of any web services and comprising one or more policies that are independent of any specific web service available for configuration in the group of systems; and causing a run-time business configuration to be generated for each of the one or more web services and each of the one or more consumer proxies, the run-time business configurations including one or more settings derived from the one or more policies of the technical configuration, the generation of the business configuration comprising replacing properties of a service description of each web service of the provider system with corresponding properties of the consumer system, the service description comprising a set of documents that describe an interface to and semantics of each web service and the properties of the consumer system comprising a destination of a destination template that is stored as part of the run-time business configuration;

wherein the run-time configurations comprise a first run-time configuration for a consumer proxy to a call a first web service having a second run time configuration, the first run-time configuration for the consumer proxy being based on content of a service description of the first web service, settings of the destination template for the provider system, and a profile referenced by the destination template; the second run-time configuration of the first web service being based on design-time attributes of the first web service and the profile of a domain to which the provider system of the web service belongs, the design-time attributes being defined during development of the first web service prior to the technical configuration of the provider system and the consumer system; and wherein the provider system and the consumer system are technically configured prior to generation of the business configurations for each of the one or more web services and each of the one or more consumer proxies.

2. The product of claim 1, wherein:
the receiving the data and the causing the run-time configurations to be generated are performed at a services registry, and the run-time configurations are generated for each of the web services and each of the consumer proxies at the provider system and consumer system, respectively.

3. The product of claim 1, wherein the operations further comprise receiving a selection of a business process to activate and determining the web services as web services of the business process to activate.

4. The product of claim 1, wherein the consumer and provider system are in another group of systems having another profile, and the operations further comprise selecting the profile from the profile and the other profile, the selecting based on one or more rules for determining a profile to which to adhere.

5. The product of claim 4, wherein each group has a ranking and the rules prescribe a profile of a group with a highest rank is to be selected.

6. The product of claim 1, wherein the settings derived from the policies of the profile are copied from the profile.

7. The product of claim 1, wherein the settings derived from the policies of the profile are based on an interpretation of the policies by a parser and a determination of one or more values for the settings based on the policies.

8. The product of claim 1, wherein the policies of the profile comprise one or more security policies for communication between the consumer proxies and the web services.

9. The product of claim 1, wherein the operations further comprise:

receiving data characterizing a name of a domain to generate for the group, the profile to associate with the domain, and a selection of the systems to add to the domain; and storing data characterizing the domain, the systems in the domain, and the profile as being associated with the domain.

10. A method comprising:
receiving, at one or more data processing computing devices, data characterizing one or more web services that are offered by a provider system and that are designated for activation for use in a group of systems, the group of systems comprising the provider system and a consumer system that calls at least one of the one or more web services via one or more consumer proxies in communication with the provider system and the consumer system, the provider system and the consumer system being configured prior to run time according to a technical configuration, the technical configuration preparing the group of systems for configuration of any web services and comprising one or more policies that are independent of any specific web service available for configuration in the group of systems; and causing a run-time business configuration to be generated for each of the one or more web services and each of the one or more consumer proxies, the run-time business configurations including one or more settings derived from the one or more policies of the technical configuration, the generation of the business configuration comprising replacing properties of a service description of each web service of the provider system with corresponding properties of the consumer system, the service description comprising a set of documents that describe an interface to and semantics of each web service and the properties of the consumer system comprising a destination of a destination template that is stored as part of the run-time business configuration;

wherein the run-time configurations comprise a first run-time configuration for a consumer proxy to a call a first web service having a second run time configuration, the first run-time configuration for the consumer proxy being based on content of a service description of the first web service, settings of the destination template for the provider system, and a profile referenced by the destination template; the second run-time configuration of the first web service being based on design-time attributes of the first web service and the profile of a domain to which the provider system of the web service belongs, the design-time attributes being defined during development of the first web service prior to the technical configuration of the provider system and the consumer system; and wherein the provider system and the consumer system are technically configured prior to generation of the business configurations for each of the one or more web services and each of the one or more consumer proxies.

11. The method of claim 10, wherein the operations further comprise receiving a selection of a business process to activate and determining the web services as web services of the business process to activate.

12. The method of claim 10, wherein the consumer and provider system are in another group of systems having another profile, and the method further comprises selecting the profile from the profile and the other profile, the selecting based on one or more rules for determining a profile to which to adhere.

13. The method of claim 10, wherein the operations further comprise:

receiving data characterizing a name of a domain to generate for the group, the profile to associate with the domain, and a selection of the systems to add to the domain; and storing data characterizing the domain, the systems in the domain, and the profile as being associated with the domain.

14. A system comprising:

one or more data processing computing devices configured to perform operations comprising:

receiving data characterizing one or more web services that are offered by a provider system and that are designated for activation for use in a group of systems, the group of systems comprising the provider system and a consumer system that calls at least one of the one or more web services via one or more consumer proxies in communication with the provider system and the consumer system, the provider system and the consumer system being configured prior to run time according to a technical configuration, the technical configuration preparing the group of systems for configuration of any web services and comprising one or more policies that are independent of any specific web service available for configuration in the group of systems; and causing a run-time business configuration to be generated for each of the one or more web services and each of the one or more consumer proxies, the run-time business configurations including one or more settings derived from the one or more policies of the technical configuration, the generation of the business configuration comprising replacing properties of a service description of each web service of the provider system with corresponding properties of the consumer system, the service description comprising a set of documents that describe an interface to and semantics of each web service and the properties of the consumer system comprising a destination of a destination template that is stored as part of the run-time business configuration;

wherein the run-time configurations comprise a first run-time configuration for a consumer proxy to a call a first web service having a second run time configuration, the first run-time configuration for the consumer proxy being based on content of a service description of the first web service, settings of the destination template for the provider system, and a profile referenced by the destination template; the second run-time configuration of the first web service being based on design-time attributes of the first web service and the profile of a domain to which the provider system of the web service belongs, the design-time attributes being defined during development of the first web service prior to the technical configuration of the provider system and the consumer system; and wherein the provider system and the consumer system are technically configured prior to generation of the business configurations for each of the one or more web services and each of the one or more consumer proxies.

* * * * *